United States Patent
Birkholz et al.

(12) 
(10) Patent No.: US 11,146,061 B2
(45) Date of Patent: Oct. 12, 2021

(54) OVERVOLTAGE PROTECTION DEVICE WITH THERMAL OVERLOAD PROTECTION DEVICE

(71) Applicant: PHOENIX CONTACT GmbH & Co.KG, Blomberg (DE)

(72) Inventors: Christian Birkholz, Lippetal (DE); Steffen Pfoertner, Springe (DE); Jens Willmann, Buende (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 43 days.

(21) Appl. No.: 16/693,396

(22) Filed: Nov. 25, 2019

(65) Prior Publication Data
US 2020/0169078 A1    May 28, 2020

(30) Foreign Application Priority Data
Nov. 26, 2018    (DE) ............... 10 2018 129 679.7

(51) Int. Cl.
*H02H 9/04* (2006.01)
*H01H 79/00* (2006.01)
*H01H 83/00* (2006.01)

(52) U.S. Cl.
CPC ............ *H02H 9/041* (2013.01); *H01H 79/00* (2013.01); *H01H 83/00* (2013.01)

(58) Field of Classification Search
CPC ......... H02H 9/041; H01H 79/00; H01H 83/00
USPC .......................................................... 361/56
See application file for complete search history.

(56) References Cited

U.S. PATENT DOCUMENTS

| 5,995,352 A * | 11/1999 | Gumley ............... H02H 9/06 361/111 |
| 9,443,683 B2 * | 9/2016 | Hrnicko ............... H01H 37/52 |
| 2001/0020888 A1 * | 9/2001 | Schon ................. H01H 85/46 337/142 |
| 2009/0027156 A1 | 1/2009 | Schlenker et al. |

(Continued)

FOREIGN PATENT DOCUMENTS

| DE | 3908236 A1 | 9/1990 |
| DE | 19809149 C2 | 9/2001 |

(Continued)

*Primary Examiner* — Yemane Mehari
(74) *Attorney, Agent, or Firm* — Leydig, Voit & Mayer, Ltd.

(57) ABSTRACT

An overvoltage protection device includes: input terminals; output terminals; at least two overvoltage protection elements for forming staggered protection levels; and at least one longitudinal element electrically connecting an input terminal and an output terminal to conduct an operating current. In order to form a first protection level, a first overvoltage protection device is connected to two input terminals on an input side upstream of the at least one longitudinal element, and, in order to form a second protection level, a second overvoltage protection element is connected to two output terminals on an output side and downstream of the at least one longitudinal element, the at least one longitudinal element influencing a response of the at least two overvoltage protection elements in case of an overvoltage. The at least one longitudinal element is provided with a thermal overload protection device for reducing a possible current flow.

10 Claims, 5 Drawing Sheets

(56) References Cited

U.S. PATENT DOCUMENTS

| | | | |
|---|---|---|---|
| 2009/0296297 A1* | 12/2009 | Willmann | H02H 9/06 |
| | | | 361/56 |
| 2011/0013335 A1 | 1/2011 | Bobert | |
| 2013/0033355 A1* | 2/2013 | Meyer | H01T 1/14 |
| | | | 337/147 |
| 2019/0154520 A1* | 5/2019 | Suchy | G01K 11/12 |
| 2020/0185912 A1* | 6/2020 | Schork | H02H 9/04 |

FOREIGN PATENT DOCUMENTS

| | | |
|---|---|---|
| DE | 102008022794 A1 | 8/2009 |
| DE | 102008043047 A1 | 4/2010 |
| WO | 2006102876 A2 | 10/2006 |

\* cited by examiner

OVERVOLTAGE PROTECTION DEVICE WITH THERMAL OVERLOAD PROTECTION DEVICE

CROSS-REFERENCE TO PRIOR APPLICATION

Priority is claimed to German Patent Application No. DE 10 2018 129 679.7, filed on Nov. 26, 2018, the entire disclosure of which is hereby incorporated by reference herein.

FIELD

The invention relates to an overvoltage protection device comprising at least two overvoltage protection elements for forming staggered protection levels and at least one longitudinal element which is designed to conduct an operating current and to influence the response of the at least two overvoltage protection elements in the event of an overvoltage.

BACKGROUND

In the area of the overvoltage protection of electrical devices or installations, overvoltage protection elements are used which respond at a certain overvoltage that would otherwise lead to disturbances and/or damage in an electrical circuit in the event of an overvoltage event. For this purpose, overvoltage protection elements have been developed which short-circuit affected devices and lines with potential equalization in a very short time. Various components with corresponding properties are available for this purpose. The components differ substantially in terms of their response and their dissipation capacity.

The required measures for protecting an electrical system are divided into different stages depending on the arrester selection and the environmental influences to be expected. The overvoltage protection elements for the individual stages differ in the level of their dissipation capacity and their protection levels.

A first protection level (type 1) is usually formed by a powerful protective device as a lightning current arrester. For example, spark gaps are used here which have at least two electrodes between which an arc is formed when the spark gap is ignited. A second protection level (type 2) is typically formed by a further surge arrester which is capable of further reducing the remaining residual voltage across the lightning current arrester of the first protection level. This surge arrester is often varistor-based. The third protection level (type 3) is referred to as device protection and is typically installed immediately upstream of the device to be protected. The device protection achieves a residual voltage which is safe for the connected device.

Overvoltage protection devices therefore frequently have several overvoltage protection elements (components) with combined protection circuits, since the desired component-specific advantages can thus be combined. For example, a first overvoltage protection element serves for coarse protection, and a second overvoltage protection element serves for fine protection. The overvoltage protection elements are, in particular, gas-filled surge arresters (gas arrester, gas discharge tube—GDT), spark gaps, varistors (metal-oxide varistor—MOV) or suppressor diodes (transient voltage suppressor diode—TVSD). These components are often connected indirectly in parallel as protection levels, so-called longitudinal elements being arranged between the overvoltage protection elements, which longitudinal elements must be adapted to the respective protection circuit. This means that ohmic or inductive decoupling elements are provided between the overvoltage protection elements as longitudinal elements, effecting a response of the staggered protective levels at different times.

In doing so, the overuse of electronic components can lead to them operating outside the spectrum of the nominal operating range. For example, the power consumption of the damaged component caused by reduced component insulation strength leads to undue heating. If such undue heating of the component is not prevented, it can lead, for example, to damage to surrounding materials, generation of flue gas or a fire hazard.

In typical overvoltage protection elements such as GDT, MOV, TVSD, solutions are therefore known which are intended to prevent undue heating. For example, DE 10 2008 022 794 A1 discloses a thermal overload protection device which shorts a gas-filled surge arrester with at least two electrodes when it reaches a temperature at which a fusible element melts.

However, longitudinal elements or decoupling elements in protective systems having several staggered protective levels can also be unduly heated by increased nominal currents or short-circuit currents occurring in the respective application. In this case, possibly inserted upstream fuses offer only limited protection. Especially with the high short-circuit powers occurring in today's systems, a very rapid rise in temperature can occur.

SUMMARY

In an embodiment, the present invention provides an overvoltage protection device, comprising: input terminals; output terminals; at least two overvoltage protection elements configured to form staggered protection levels; and at least one longitudinal element configured to electrically connect an input terminal and an output terminal to conduct an operating current, wherein, in order to form a first protection level, a first overvoltage protection device is connected to two input terminals on an input side upstream of the at least one longitudinal element, and, in order to form a second protection level, a second overvoltage protection element is connected to two output terminals on an output side and downstream of the at least one longitudinal element, the at least one longitudinal element being configured to influence a response of the at least two overvoltage protection elements in case of an overvoltage, and wherein the at least one longitudinal element is provided with a thermal overload protection device configured to reduce a possible current flow through the at least one longitudinal element when a triggering temperature is reached.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an overvoltage protection device for protecting electrical installations against overvoltage, which further reduces the risk of undue heating of components.

The overvoltage protection device according to the invention has input terminals, output terminals, at least two overvoltage protection elements for forming staggered protection levels and at least one longitudinal element. The overvoltage protection device according to the invention with its components can be implemented in a device which can be integrated into an electrical installation via the input and output terminals in order to protect against overvoltage. The longitudinal element electrically connects an input terminal and an output terminal to conduct an operating current. Furthermore, a first overvoltage protection element for forming a first protection level is connected to two input terminals on the input side upstream of the longitudinal element, and a second overvoltage protection element is connected to two output terminals on the output side downstream of the longitudinal element in order to short-circuit devices and lines connected to the overvoltage protection device with potential equalization. During normal operation of the overvoltage protection device, i.e. in a state without an overvoltage event, an operating current of at least one consumer that is connected to the overvoltage protection device therefore passes through a longitudinal element. In contrast, such an operating current does not flow through the overvoltage protection elements during normal operation.

In this way, at least two overvoltage protection elements are connected indirectly in parallel as protection levels, at least one longitudinal element being located between the two overvoltage protection elements. Such a longitudinal element is also referred to as decoupling element or decoupling member. More than two protection levels may be provided, wherein each protection level may comprise more than one overvoltage protection element. Consequently, several longitudinal elements can also be provided. In particular, three protective levels are formed. In modern overvoltage protection devices (SPD—Surge Protective Device) for use in MSR systems, two protection levels are typically used.

Gas-filled surge arresters (gas discharge tube—GDT), spark gaps, varistors (metal oxide varistors—MOV) and/or suppressor diodes (transient voltage suppressor diode—TVSD) are used as overvoltage protection elements, for example. These have different response characteristics and dissipation capacity and can be suitably combined in staggered protection levels in order to realize a desired overall overvoltage protection. In particular, different overvoltage protection elements can be used for coarse protection and fine protection. For example, a gas arrester offers a high dissipation capacity, while a TVS diode offers a low protection level as well as a fast response. Modern overvoltage protection devices match different overvoltage protection elements with one another in order to optimally utilize their respective advantages. In order to achieve this, longitudinal elements (decoupling elements) are inserted between the overvoltage protection elements. These are ohmic or inductive decoupling elements which effect a response of the staggered protective levels at different times. For example, resistors or impedances are used.

According to the invention, the at least one longitudinal element of the overvoltage protection device is therefore designed for influencing the response of the at least two overvoltage protection elements in case of overvoltage. This is achieved by the arrangement of the longitudinal element in the circuit of the overvoltage protection device and by the level of the resistors or impedances used.

According to the invention, at least one such longitudinal element is provided with a thermal overload protection device which is designed to reduce the possible current flow through the longitudinal element when a triggering temperature is reached. If the longitudinal element is unduly heated due to operation in an unspecified region, it is thus transferred into a safe state. Thermal overload is avoided and thus a danger that would result from such an overload. In the overvoltage protection device according to the invention, the risk of undue heating of components is thus considerably reduced. The risk of damage to materials, the generation of flue gases or even a fire hazard can thus be advantageously reduced. The safety of today's systems with high short-circuit powers which occur can be improved in this way.

The risks can be further reduced if the overvoltage protection elements are also provided with an overload protection against undue heating. For example, in one embodiment of the invention, at least one overvoltage protection element is provided with a thermal overload protection device which is designed to bridge the overvoltage protection element when a triggering temperature is reached and/or to interrupt the current flow to the overvoltage protection element.

In this case, the possible current flow through a longitudinal element is reduced in particular to a current intensity of 0 A or approximately 0 A. However, it can also be reduced to other values which would allow sufficient cooling of the longitudinal element. In order to transfer a longitudinal element into such a safe state, various measures are possible. On the one hand, the longitudinal element can be bridged in order to reduce the current flow through the longitudinal element. This is done in particular by a short circuit of lines to which the longitudinal element is electrically connected for conducting a current. In addition, the short-circuit current can now flow and a fuse arranged preferably upstream can trigger. On the other hand, the current flow to the longitudinal element can be interrupted by suitable means. The longitudinal element is then switched off, as it were. A combination of these measures is also possible. For this purpose, the thermal overload protection device can be designed in various ways.

In a first embodiment of the invention, the thermal overload protection device comprises a contact element. Reaching a triggering temperature causes a movement of the contact element, through which the longitudinal element is bridged and/or the current flow to the longitudinal element is interrupted. In a further embodiment of the invention, a longitudinal element is electrically connected via terminals to conductor paths of a conductor path support. The thermal overload protection device again has a contact element, and reaching a triggering temperature causes a movement of the contact element, by means of which, for one, the conductor tracks on the two connections are electrically connected via the contact element. In an alternative embodiment, the two terminals are directly connected to one another via the contact element. Overall, the longitudinal element is thus bridged by the contact element, i.e. the conductor paths on the terminals are short-circuited.

In a further embodiment of the invention, the movement of a contact element causes the current path to separate upstream and/or downstream the longitudinal element. When several measures are combined, both the current path upstream from and/or downstream from the longitudinal element are separated and the longitudinal element is bridged. In this way, current can continue to flow through the overvoltage protection device, but the longitudinal element affected by undue heating is switched off.

In particular, a contact element is connected to a longitudinal element via a thermosensitive connection. The disconnection of this thermosensitive connection when a triggering temperature is reached causes a movement of the contact element. This thermosensitive connection is, for example, a soldered connection. However, other types of fusible contacts may also be used.

The material, shape and arrangement of the thermosensitive compound are selected in such a way that the thermosensitive compound dissolves at a triggering temperature which substantially corresponds to the temperature which the longitudinal element should not exceed. In order for the contact element to move when the thermosensitive connection is released, it is preferably prestressed and/or mounted under the action of a spring force. The prestressing or spring force acts in particular against the holding force of the thermosensitive connection. If the prestressing or spring force exceeds the holding force of the thermosensitive connection, the latter is released and allows a movement of the contact element. The contact element then opens or closes a contact. However, embodiments in which the prestressing or spring force acts in the direction of the holding force of the thermosensitive connection are also encompassed by the invention. In such embodiments, the thermosensitive compound reacts upon melting under pressure, thereby allowing a contact element to move.

The triggered state of a contact element can be permanent or only temporary. In one embodiment of the invention, it is therefore provided that the thermal overload protection device is designed to permanently or temporarily bridge the longitudinal element and/or to interrupt the current flow to the longitudinal element when a triggering temperature is reached. A temporary reduction of the possible current flow through a longitudinal element is achieved, for example, by a contact element which is at least partially formed from a shape memory material such as a bimetal. When the longitudinal element to be protected is heated, the bimetal heats up and deforms, as a result of which it either closes or releases a contact. The longitudinal element can now cool together with the bimetal. After cooling has taken place, the bimetal moves back into its original position and the longitudinal element is again active in the circuit.

Often, an overvoltage protection device having several protection levels also has several longitudinal elements. In such a case, preferably several longitudinal elements are provided which are each provided with a respective thermal overload protection device.

In particular, the overvoltage protection device according to the invention can be used in measuring and regulating technology and for protecting low-voltage electrical installations. Furthermore, the respective overload protection device can also be subsequently provided on a longitudinal element of an existing overvoltage protection device.

Figure 1:
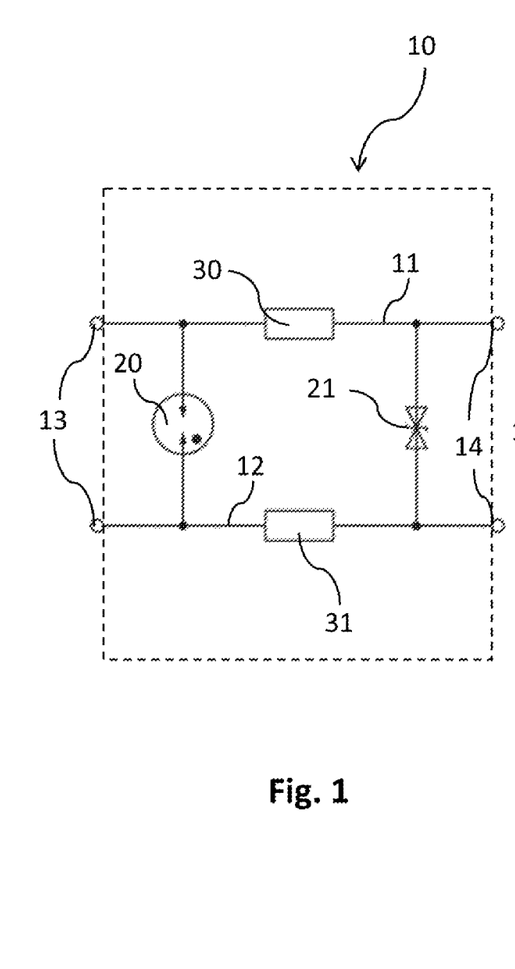
FIG. 1 a schematic representation of a two-level overvoltage protection device, FIG. 2 a schematic representation of a three-level overvoltage protection device, FIG. 3 a schematic representation of the bridging of a longitudinal element, FIG. 4 a schematic representation of the separation of a longitudinal element, FIG. 5 two views (a) and (b) of a longitudinal element with a first embodiment of an overload protection device in the normal state, FIG. 6 two views (a) and (b) of a longitudinal element according to FIG. 5 in the triggered state, FIG. 7 two views (a) and (b) of a longitudinal element with a second embodiment of an overload protection device in the normal state, FIG. 8 two views (a) and (b) of a longitudinal element according to FIG. 7 in the triggered state, FIG. 9 a schematic illustration of a longitudinal element with a third embodiment of an overload protection device in the normal state, and FIG. 10 the longitudinal element according to FIG. 9 in the triggered state.
Figure 2:
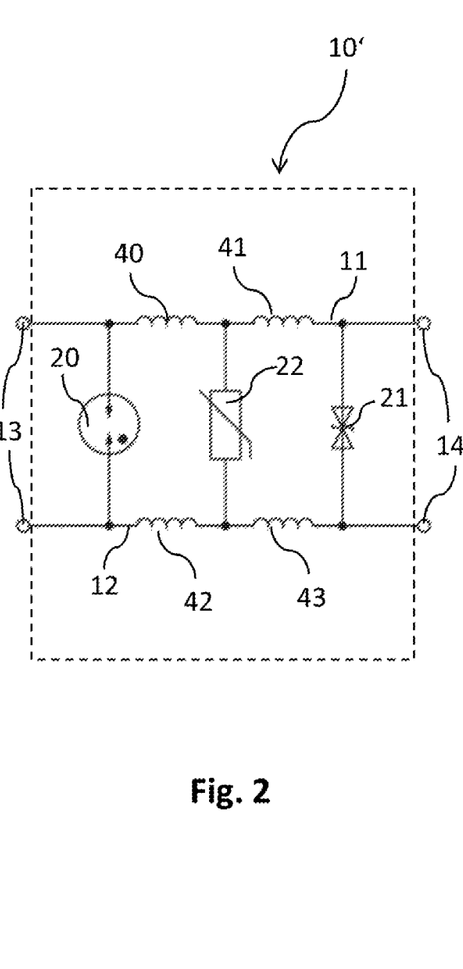

The overvoltage protection device according to the invention has several staggered protection levels, i.e. two or more protection levels. FIG. 1 schematically shows the design of a two-level overvoltage protection device 10, while FIG. 2 schematically shows the design of a three-level overvoltage protection device 10'. This simplified design is, however, to be understood only as an example in order to explain the essential features of the overvoltage protection device according to the invention. In detail, an overvoltage protection device may be much more complex and executed with further components.

The two-level overvoltage protection device 10 has two input terminals 13 and two output terminals 14. The overvoltage protection device 10 is directly or indirectly connected to one or more consumers via the output terminals 14. The same applies to the three-level overvoltage protection device 10' with its output terminals 14.

To form staggered protective levels, at least two overvoltage protection elements are provided which are designed for rapid short-circuiting with potential equalization. The two-level overvoltage protection device 10 has two overvoltage protection elements 20 and 21. In this case, the overvoltage protection element 20 is a gas arrester for coarse protection, while the overvoltage protection element 21 is a suppressor diode for fine protection. In the three-level overvoltage protection device 10', a varistor 22 is used as the middle level.

Furthermore, at least one longitudinal element is provided that electrically connects an input terminal 13 and an output terminal 14 via a path 11 in order to conduct an operating current. The two-level overvoltage protection device 10 consists of two longitudinal elements 30 and 31 as ohmic decoupling elements, a second longitudinal element 31 likewise being inserted in the path 12 between an output terminal 14 and an input terminal 13. The three-level overvoltage protection device 10' consists of four longitudinal elements 40, 41, 42, and 43 as inductive decoupling elements in paths 11 and 12.

In the two-level overvoltage protection device 10', a first overvoltage protection element 20 such as the gas arrester for forming a first protection level is connected to two input terminals 13 on the input side upstream of the longitudinal element 30, and a second overvoltage protection element 21 such as the suppressor diode is connected to two output terminals 14 on the output side downstream of the longitudinal element 30. The longitudinal element 30 is thus located electrically between the two overvoltage protection elements 20 and 21, which also applies to the longitudinal element 31. The at least one longitudinal element 30, 31 is designed to influence the response of the at least two overvoltage protection elements 20, 21 in case of an overvoltage. The overvoltage protection elements 20 and 21 are thus indirectly connected in parallel. The same applies to the three overvoltage protection elements 20, 21, and 22 of the three-level overvoltage protection device 10' and its longitudinal elements 40, 41, 42, and 43.

The desired component-specific advantages can be pooled with this combination of different components. For example, such circuit combinations of gas arresters and suppressor diodes in FIG. 1 represent a standard protection circuit for sensitive signal interfaces. This combination provides a powerful and fast-responding protection with the best protection level possible. The longitudinal elements thereby bring about a response of the staggered protective levels at different times, wherein the suppressor diode 21 responds first, and subsequently the gas arrester 20. The depicted circuit of FIG. 1 offers the advantages of a fast response at low voltage limitation and at the same time features a high dissipation capacity. A three-level protective circuit according to FIG. 2 with inductive decoupling works according to the same principle. However, the commutation here takes place in two steps: first from the suppressor diode 21 to the varistor 22 and then further to the gas arrester 22.

In an overvoltage protection device basically designed in this way, at least one longitudinal element is provided with a thermal overload protection device which is designed to reduce the possible current flow through the longitudinal element when a triggering temperature is reached, in order to transfer it into a safe state. Two approaches are substantially pursued in this case. The longitudinal element is bridged when a triggering temperature is reached and/or the current flow to the longitudinal element is interrupted. In the first approach, the longitudinal element is, as it were, short-circuited and, in the second approach, the longitudinal element is switched off or disconnected, as it were. Both approaches can also be combined.

Figure 3:
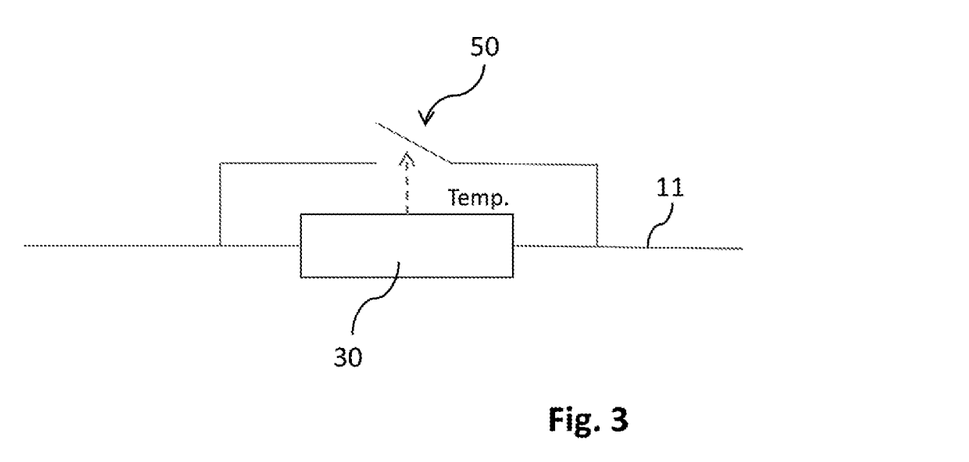
Figure 4:
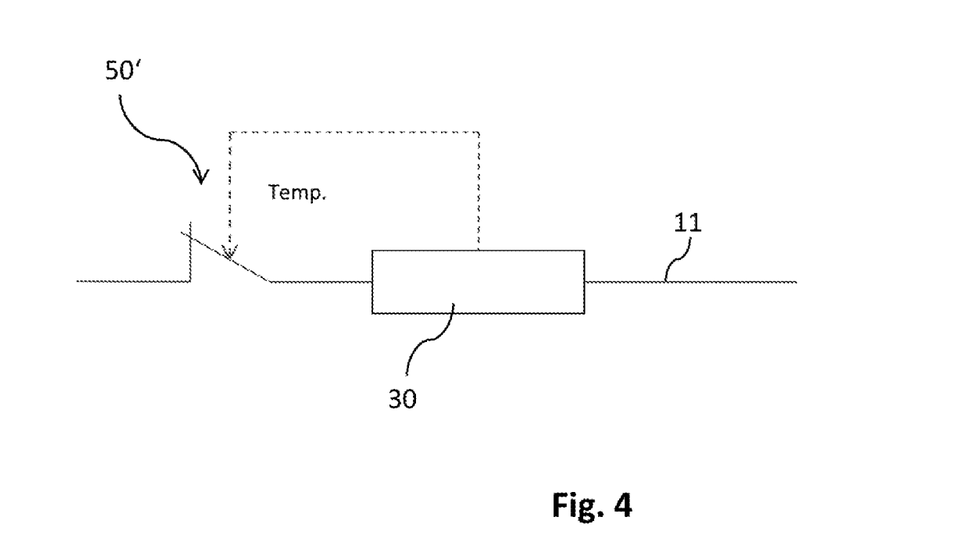

FIG. 3 schematically shows the operation of a thermal overload protection device 50 on a longitudinal element 30 in bridging the longitudinal element 30 in the path 11. The temperature increase of the longitudinal element 30 causes, for example, the closing of an otherwise open contact, as a result of which the longitudinal element 30 is short-circuited. FIG. 4 schematically shows the operation of an alternative thermal overload protection device 50' on a longitudinal element 30 when the longitudinal element is disconnected. The temperature increase of the longitudinal element 30 causes, for example, the opening of an otherwise closed contact in the path 11, as a result of which the current flow to the longitudinal element 30 is prevented.

FIGS. 5 to 10 show various embodiments of thermal overload protection devices with which the aforementioned measures can be effected. They all have in common that they have a contact element and, when a triggering temperature is reached, a movement of the contact element is effected, by means of which the longitudinal element is bridged. The respective contact elements are connected to the longitudinal element via a thermosensitive connection.

Figure 5:
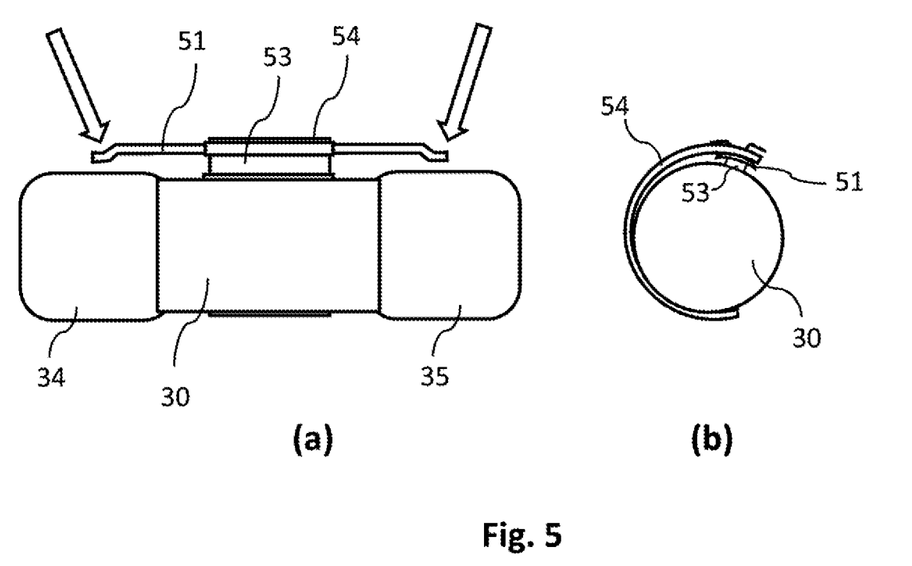

FIG. 5 shows two views (a) and (b) of a longitudinal element 30 with a first embodiment of an overload protection device in the normal state. A contact element 51 is connected to the longitudinal element 30 via a thermosensitive connection 53. The contact element 51 is implemented in the shape of a bracket and extends with its dimensions into two connection regions 34, 35 of the longitudinal element 30 which enable the electrical connection of the longitudinal element in a current path. The contact element 51 is held on the longitudinal element 30 via a contact clamp 54, wherein it is in particular snapped onto the central region of the longitudinal element 30 by means of this contact clamp 54. This type of overload protection device can therefore also be subsequently snapped onto an existing longitudinal element in order to provide it with a thermal overload protection device The contact element 51 is connected to the longitudinal element 30 via a thermosensitive connection in the form of a fusible element 53. When the longitudinal element 30 heats up to a certain triggering temperature, the fusible element 53 liquefies.

Figure 6:
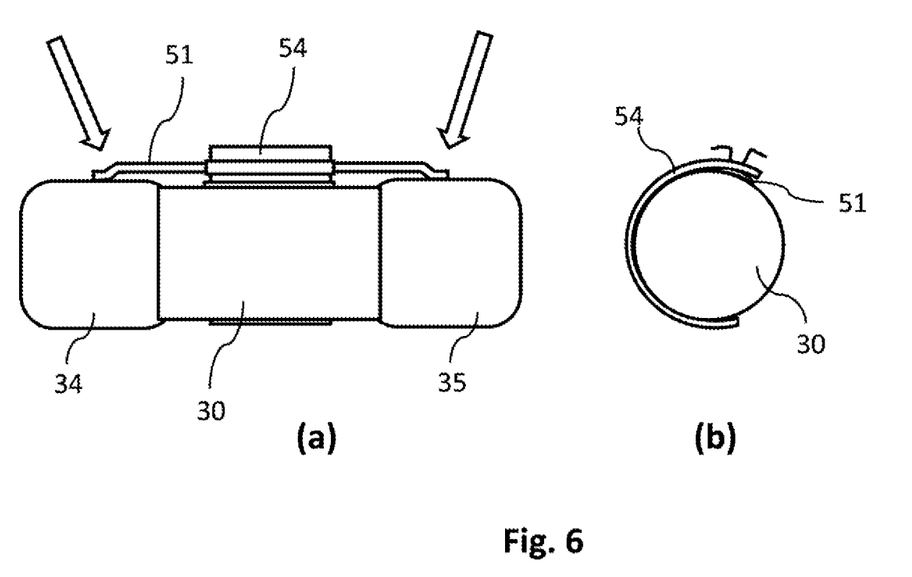

The contact element 51 is furthermore mounted in a prestressed and/or spring-loaded manner and, in fact, forces act on the two ends of the contact element 51 in the direction of the two arrows by means of this feature. These forces can be generated by suitable means such as springs, stops, etc. The contact element does not come into contact with the two end-side connection regions 34, 35 in this state. If, however, the fusible element 53 melts in case of an undue heating of the longitudinal element 30, the contact element 51 yields to the forces acting on it and contacts the two connection regions 34, 35. The two connection regions 34, 35 are thus short-circuited and the longitudinal element 30 overall bridged in a current path. FIG. 6 shows this triggered state.

Figure 7:
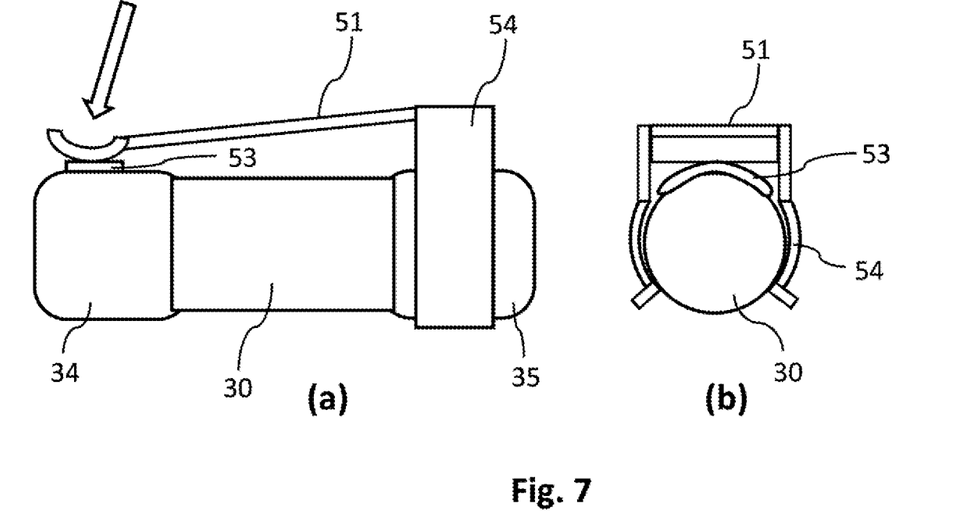

FIG. 7 shows two views (a) and (b) of a longitudinal member 30 with a second embodiment of an overload protection device in the normal state. A contact element 51 is likewise connected to the longitudinal element 30 via a thermosensitive connection 53. The contact element 51 is held on the longitudinal element 30 via a contact clamp 54, wherein it is in particular snapped onto the connection region 35 of the longitudinal element 30 by means of this contact clamp 54. This type of overload protection device can therefore also be subsequently snapped onto an existing longitudinal element in order to provide it with a thermal overload protection device.

Figure 8:
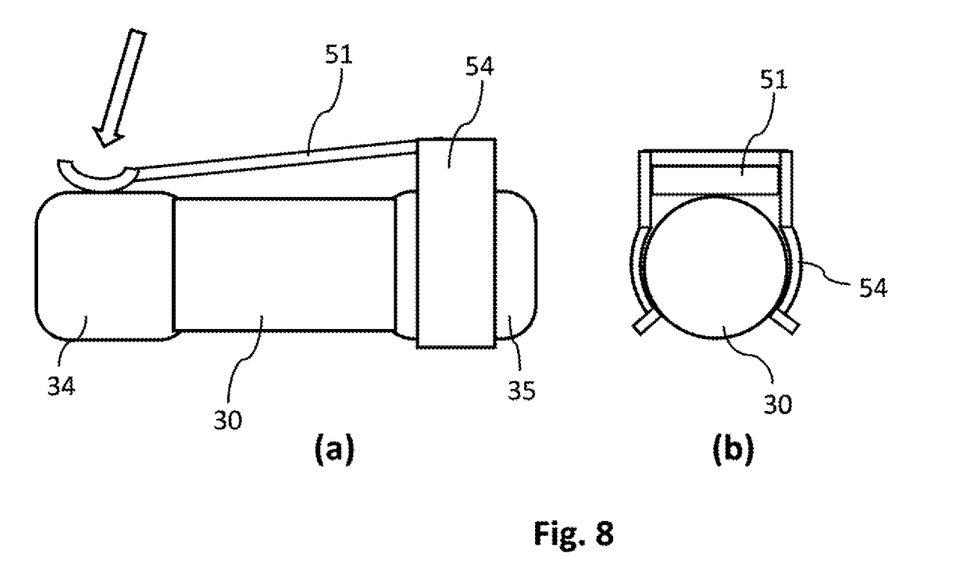

The contact element 51 is connected to the connection region 34 of the longitudinal element 30 via a thermosensitive connection in the form of a fusible element 53. The contact element 51 is furthermore mounted in a biased and/or spring-loaded manner and, in fact, forces act in the direction of the arrow on the end of the contact element 51 which lies in the area of the connection region 34. However, the contact element does not come into contact with the connection region 34 in this state. If the fusible element 53 melts with an undue heating of the longitudinal element 30, the contact element 51 yields to the force acting on it and comes into contact with the connection region 34. The two connection regions 34, 35 are thus short-circuited via the contact element and the contact clamp 54 and the longitudinal element 30 is bridged overall in a current path. FIG. 8 shows this triggered state.

Such an embodiment of FIGS. 7 and 8 can also be modified to an overload protection device which only temporarily shorts a longitudinal element. For example, the fusible element 53 and the forces acting on the contact element can be dispensed with. The contact element 51 is then at a distance from the connection region 34 when in the normal state. However, the contact element is at least partially made of a shape memory material such as a bimetal. When the bimetal is heated, the contact element 51 deforms in the direction of the connection region 34 until an electrical contact is established between the contact element 51 and the connection region 34. This triggered state corresponds to the situation in FIG. 8.

The longitudinal element 30 is thus short-circuited and allowed to cool. As a result, the bimetal also cools down, so that it returns to its original shape and position after cooling of the longitudinal element has taken place. The contact between the contact element 51 and the connection region 34 is disengaged again and the short circuit canceled.

Figure 9:
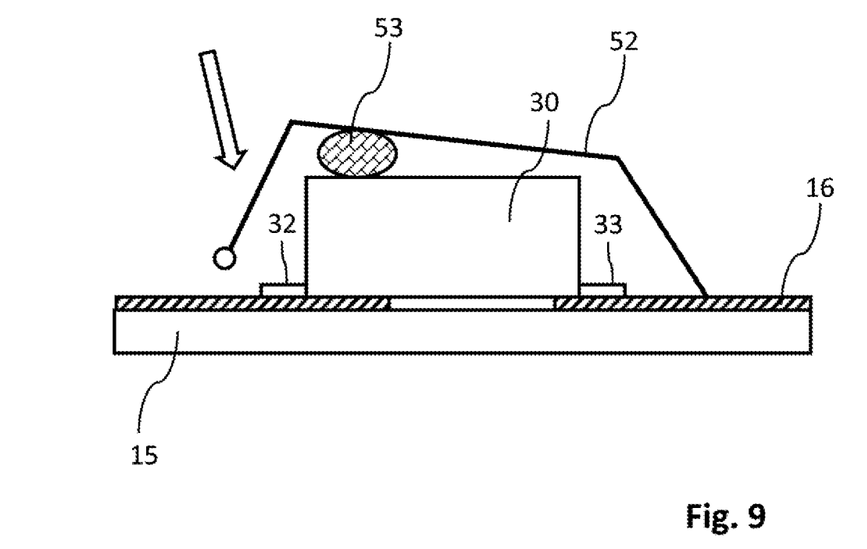
Figure 10:
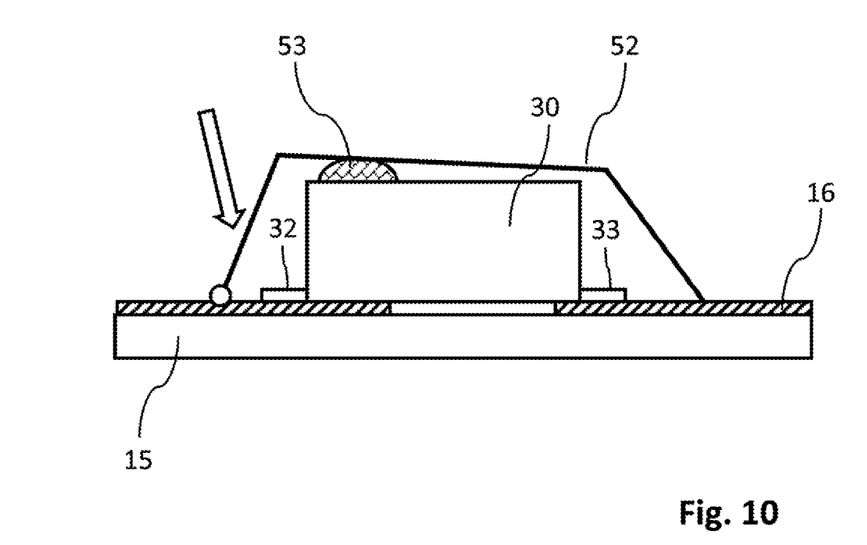

FIGS. 9 and 10 show another possible embodiment of an overload protection device which does not directly short a longitudinal element 30 but conductor paths 16 on which the longitudinal element 30 is mounted. The conductor paths 16 are located on a flat conductor path support 15 and form a current path. The longitudinal element 30 is conductively attached to these conductor paths 16 via terminals 32, 33, which is done, for example, via solder connections. A bracket-shaped contact member 52 is connected to one of the conductor paths 16 on the terminal 33 side. Furthermore, the contact element 52 projects beyond the longitudinal element 30 and is in contact with the latter via a fusible element 53. It does not contact the conductor path 16 in the region of the terminal 32, but a force in the direction of the arrow acts on this end of the contact element 52. This force can be generated by prestressing the contact element 52 and/or by means of spring forces. FIG. 9 shows this normal state of the overload protection device.

When the fusible element 53 is now heated, it softens and yields to the pressure of the contact element 52. The contact element 52 can thus come into contact with the conductor path 16 in the region of the terminal 32 whereby it completely spans the longitudinal element 30 and forms a short-circuit bridge. This triggered state is shown in FIG. 10.

The embodiment of FIGS. 9 and 10 can be modified in such a way that the bracket-shaped contact element 52 in the normal state has no contact with the conductor paths 16 in the region of both terminals 32, 33. In the triggered state, it then lowers in the direction of the longitudinal element 30 and contacts the conductor path 16 in the region of both connections 32, 33 in order to short the longitudinal element 30. Various other modifications are also possible.

Furthermore, it can be provided that a contact is opened in that a prestressed or spring-loaded contact element is released by dissolving a thermosensitive connection when the force acting on the contact element exceeds the holding force of the thermosensitive connection. The possible current flow to a longitudinal element can thus be interrupted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Overvoltage protection device 10, 10'
Path 11, 12
Input terminal 13
Output terminal 14
Conductor path support 15
Conductor path 16
Overvoltage protection element, gas arrester 20
Overvoltage protection element, suppressor diode 21
Overvoltage protection element, varistor 22
Longitudinal element, decoupling resistor 30, 31
Terminal 32, 33
Connection region 34, 35
Longitudinal element, decoupling inductance 40, 41, 42, 43
Overload protection device 50, 50'
Contact element 51, 52
Fusible element 53
Contact clamp 54

What is claimed is:

1. An overvoltage protection device, comprising:
   input terminals;
   output terminals;
   at least two overvoltage protection elements configured to form staggered protection levels; and
   at least one longitudinal element configured to electrically connect an input terminal and an output terminal to conduct an operating current,
   wherein, in order to form a first protection level, a first overvoltage protection device is connected to two input terminals on an input side upstream of the at least one longitudinal element, and, in order to form a second protection level, a second overvoltage protection element is connected to two output terminals on an output side and downstream of the at least one longitudinal element, the at least one longitudinal element being configured to influence a response of the at least two overvoltage protection elements in case of an overvoltage, and
   wherein the at least one longitudinal element is provided with a thermal overload protection device configured to reduce a possible current flow through the at least one longitudinal element when a triggering temperature is reached.

2. The overvoltage protection device according to claim 1, wherein the thermal overload protection device is configured to bridge the at least one longitudinal element when a triggering temperature is reached and/or to interrupt the current flow to the at least one longitudinal element.

3. The overvoltage protection device according to claim 1, wherein the thermal overload protection device comprises a contact element and, when a triggering temperature is reached, is configured to effect a movement of the contact element, by which the at least one longitudinal element is bridged and/or the current flow to the at least one longitudinal element is interrupted.

4. The overvoltage protection device according to claim 1, wherein the at least one longitudinal element is electrically connected to conductor paths of a conductor path support via terminals, the thermal overload protection device has a contact element, and, when a triggering temperature is reached, a movement of the contact element is effected, by which the conductor paths are electrically connected to the two terminals via the contact element.

5. The overvoltage protection device according to claim 3, wherein the contact element is mounted in a prestressed manner and/or an exterior spring force acts on the contact element.

6. The overvoltage protection device according to claim 3, wherein the contact element is connected to the at least one longitudinal element via a thermosensitive connection, and a disconnection of the thermosensitive connection causes a movement of the contact element.

7. The overvoltage protection device according to claim 1, wherein the thermal overload protection device is configured to permanently or temporarily bridge the at least one longitudinal element when a triggering temperature is reached and/or to interrupt the current flow to the at least one longitudinal element.

8. The overvoltage protection device according to claim 3, wherein the contact element at least partially comprises a shape memory material.

9. The overvoltage protection device according to claim 1, wherein the at least one longitudinal element comprises a plurality of longitudinal elements, each of which is equipped with a respective thermal overload protection device.

10. The overvoltage protection device according to claim 1, wherein at least one overvoltage protection element is provided with a thermal overload protection device configured to bridge the overvoltage protection element when a triggering temperature is reached and/or to interrupt a current flow to the overvoltage protection element.

* * * * *